United States Patent
Aurelio et al.

(10) Patent No.: US 11,516,105 B2
(45) Date of Patent: Nov. 29, 2022

(54) INTERSPERSED MESSAGE BATCHING IN A DATABASE SYSTEM

(71) Applicant: Salesforce.com, Inc., San Francisco, CA (US)

(72) Inventors: Michael Aurelio, San Francisco, CA (US); Eric Paul Wittke, San Francisco, CA (US); Laurel Knell, San Francisco, CA (US); Bradly Zavakos, Indianapolis, IN (US); Abigail Kutruff, San Francisco, CA (US); Jon Belkowitz, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 119 days.

(21) Appl. No.: 16/882,183

(22) Filed: May 22, 2020

(65) Prior Publication Data
US 2021/0367873 A1 Nov. 25, 2021

(51) Int. Cl.
| | |
|---|---|
| *H04L 43/16* | (2022.01) |
| *G06F 16/901* | (2019.01) |
| *H04L 67/10* | (2022.01) |
| *H04L 47/50* | (2022.01) |
| *H04L 65/612* | (2022.01) |

(52) U.S. Cl.
CPC .......... *H04L 43/16* (2013.01); *G06F 16/9017* (2019.01); *H04L 65/612* (2022.05); *H04L 67/10* (2013.01); *H04L 47/50* (2013.01)

(58) Field of Classification Search
CPC ..... H04L 43/16; H04L 65/4084; H04L 67/10; G06F 16/9017
See application file for complete search history.

(56) References Cited

U.S. PATENT DOCUMENTS

| | | | |
|---|---|---|---|
| 2005/0015492 A1* | 1/2005 | Kumbalimutt | H04L 67/1025 709/226 |
| 2008/0126516 A1* | 5/2008 | Holt | G06F 9/52 709/218 |
| 2011/0107374 A1* | 5/2011 | Roberts | H04N 21/6582 725/50 |
| 2011/0274261 A1* | 11/2011 | Casalaina | H04L 41/22 379/93.23 |
| 2014/0122726 A1* | 5/2014 | Jafry | H04L 65/4015 709/227 |
| 2016/0019597 A1* | 1/2016 | Smith | G06Q 30/0277 705/14.71 |
| 2016/0280040 A1* | 9/2016 | Connell | G05D 23/1934 |
| 2018/0219830 A1* | 8/2018 | O'Brien | H04L 51/18 |
| 2020/0099771 A1 | 3/2020 | Hsu et al. | |

\* cited by examiner

*Primary Examiner* — Walter J Divito
*Assistant Examiner* — Anthony Luo
(74) *Attorney, Agent, or Firm* — Kwan & Olynick LLP (57) ABSTRACT

A message batching configuration may be determined for transmitting a message to recipients. The message batching configuration may include two or more message batches, a respective recipient count for each message batch, a respective time delay between each message batch, and a performance metric for evaluating the message. The message is transmitted in accordance with the message batching configuration. The transmission of subsequent message batches is halted when it is determined that the designated performance metric fails to meet a designated performance metric threshold.

20 Claims, 7 Drawing Sheets

INTERSPERSED MESSAGE BATCHING IN A DATABASE SYSTEM

FIELD OF TECHNOLOGY

This patent document relates generally to database systems and more specifically to message transmission.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

One use of a cloud computing system is a network-accessible database system. A database system associated with a cloud computing service provider may store information associated with various organizations accessing computing services via the service provider.

Another use of a cloud computing system is message distribution. An organization accessing computing services via the service provider may employ cloud computing resources to facilitate communication with a variety of entities or individuals, such as the organization's customers. Managing such communication presents significant technical problems. Accordingly, improved techniques for managing mass communication in a database system are desired.

BRIEF DESCRIPTION OF THE DRAWINGS

The included drawings are for illustrative purposes and serve only to provide examples of possible structures and operations for the disclosed inventive systems, apparatus, methods and computer program products for interspersed message batching. These drawings in no way limit any changes in form and detail that may be made by one skilled in the art without departing from the spirit and scope of the disclosed implementations.

DETAILED DESCRIPTION

According to various embodiments, techniques and mechanisms described herein provide for eased message transmission in which the recipients of a message intended for mass transmission may be divided into batches. The message may then be transmitted to different batches of recipients in succession, with monitoring as to the performance of each message batch. In this way, the transmission of messages having a relatively low performance rate may be automatically halted.

Consider the situation facing Alexandra, a systems administrator for a large company. Alexandra would like to send out a message to the entire organization requesting that each individual perform a task, such as upgrading a particular software application. However, Alexandra may be unsure as to whether users will comply with the request, as well as whether the system is able to handle large scale deployment. Using conventional techniques, Alexandra could manually select message recipients, then manually send the message, verify responses, and repeat as necessary. However, such an approach would involve considerable effort on her part, as well as being difficult to monitor. In contrast to these conventional techniques, techniques and mechanisms described herein allow Alexandra to automatically and dynamically configure and transmit a message to recipients in which the performance of the message is monitored and used to determine whether to send successive batches of messages. In this way, performance of the messaging process is increased, while at the same time substantially reducing manual involvement in the process.

In particular embodiments, techniques and mechanisms described herein may be used for transmitting marketing messages. For example, a marketer may be confronted with many different communication channels and many different potential messaging targets. Sending out massed messages to many targets at once risks experiencing low message performance if, for example, a mistake is made in message targeting or formulation. Techniques and mechanisms described herein provide for improved performance of marketing messages for both the marketer and the recipient since low-performing messages may be halted to allow improvements to be made.

Figure 1:
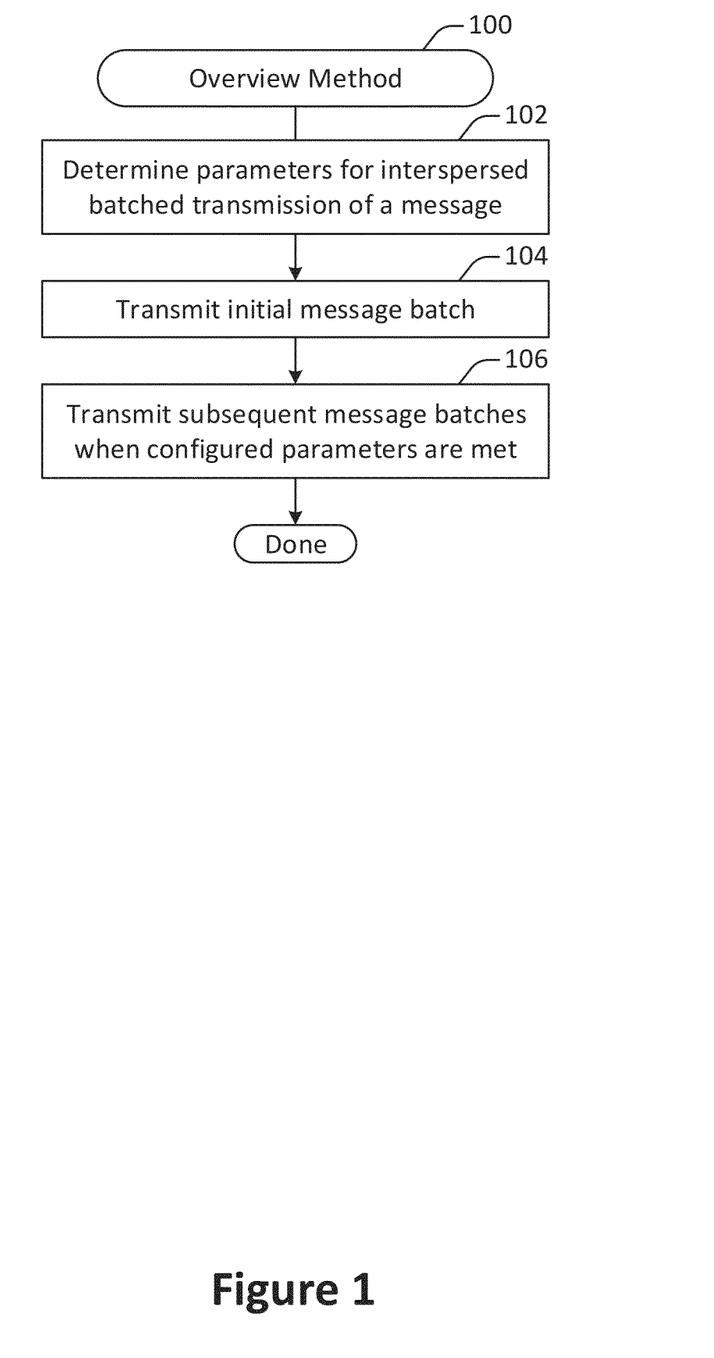
FIG. 1 illustrates an example of an overview method for message transmission, performed in accordance with one or more embodiments.

FIG. 1 illustrates an example of an overview method 100 for message transmission, performed in accordance with one or more embodiments. According to various embodiments, the method 100 may be performed at a database system. For example, the method 100 may be performed at a device or system shown in FIG. 4, FIG. 5, and/or FIG. 6.

One or more parameters for interspersed batched transmission of a message are determined at 102. The configuration of interspersed batched message transmission is discussed in additional detail with respect to the method 200 shown in FIG. 2.

An initial message batch is transmitted at 104. Then, one or more subsequent message batches are transmitted at 106 when configured parameters are met. Techniques for transmitting message batches are discussed in additional detail with respect to the method 300 shown in FIG. 3.

Figure 7:
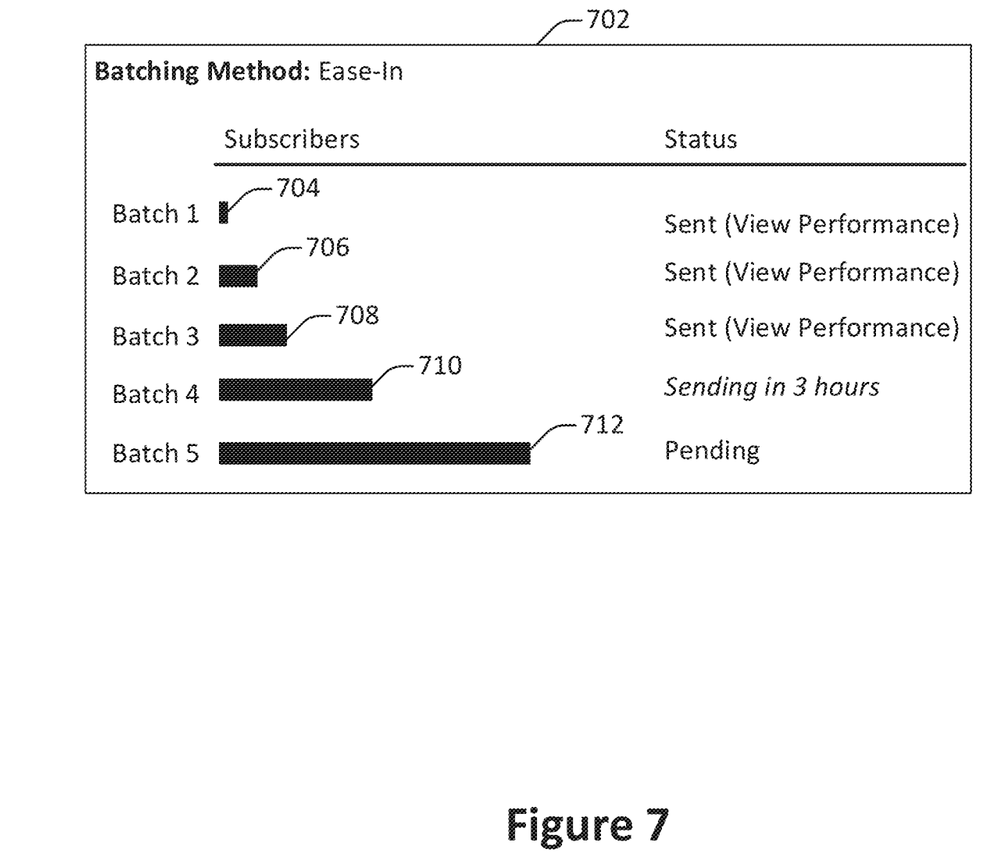
FIG. 7 illustrates one example of a graphical user interface configured in accordance with one or more embodiments.

FIG. 7 illustrates one example of a graphical user interface 702 configured in accordance with one or more embodiments. The graphical user interface 702 illustrates one example of an interface that may be presented as part of interspersed batched message transmission. The graphical user interface is shown in a state after three batches of messages have ben sent and two remain to be sent. The items 704, 706, and 708 identify the first three message batches, with the bars showing the relative number of recipients of the different message batches. As can be seen from the bars, the number of recipients is increasing with each successive batch. The batch 4 710 is configured to be sent in three hours, and the sending of the batch 5 712 is dependent on the performance of previous batches. For any batch that has been sent, performance of the batch may be viewed.

Figure 2:
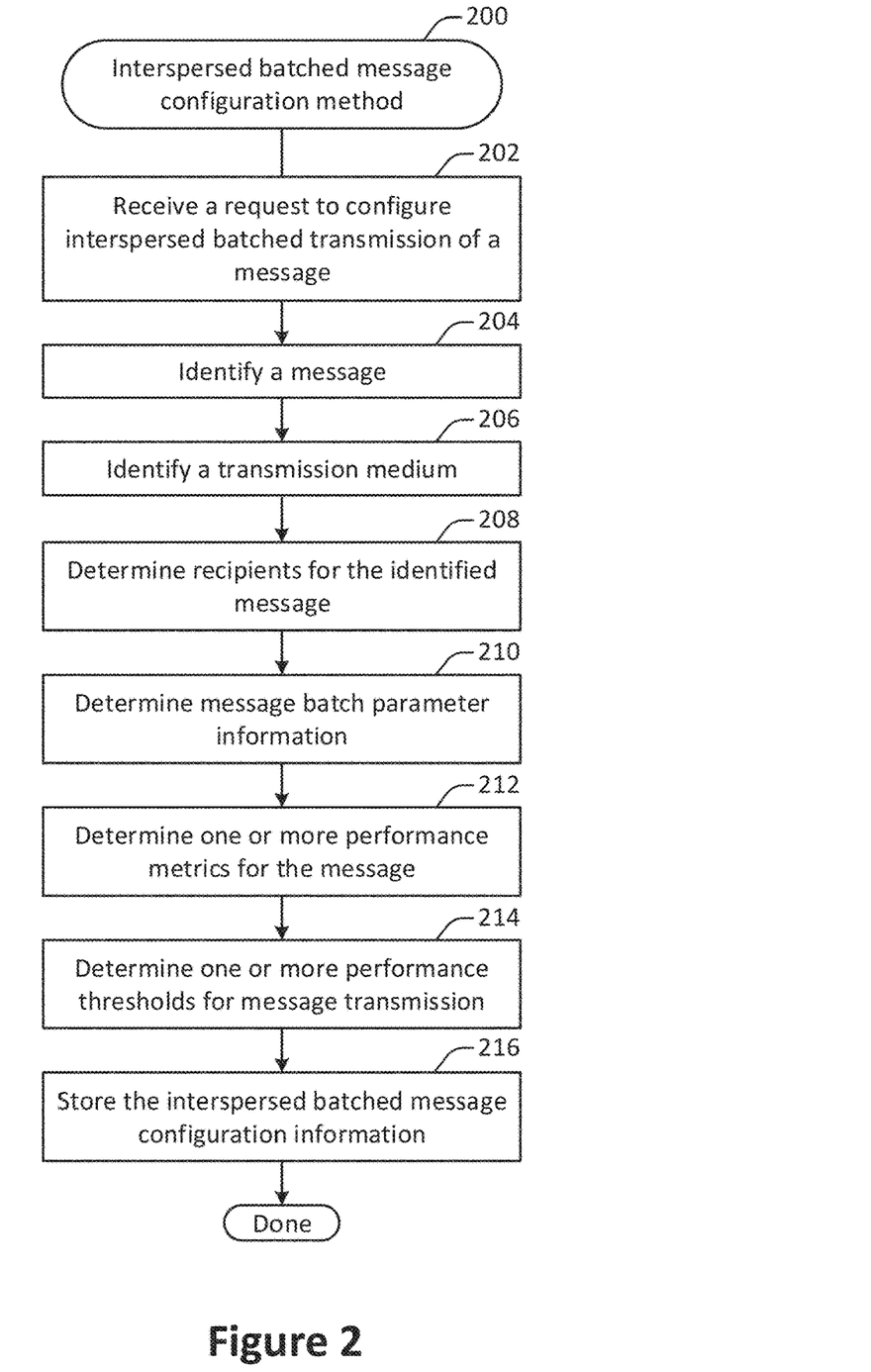
FIG. 2 illustrates an example of an method for interspersed batched message configuration, performed in accordance with one or more embodiments.

FIG. 2 illustrates an example of an method 200 for interspersed batched message configuration, performed in accordance with one or more embodiments. According to various embodiments, the method 200 may be performed at a database system. For example, the method 200 may be performed at a device or system shown in FIG. 4, FIG. 5, and/or FIG. 6. The method 200 may be performed in conjunction with other operations described herein, such as those discussed with respect to FIG. 1 and/or FIG. 3.

A request to configure interspersed batched transmission of a message is received at 202. According to various embodiments, the request may be generated based on user input. For instance, a user may submit a request to configure a message via a graphical user interface associated with a database system.

A message is identified at 204. According to various embodiments, the message may be provided by a user. For instance, a user may input text, upload a file, or provide the message via one or more of any of a variety of message formats. Alternatively, or additionally, a message may be automatically determined by the system. For instance, a system may be configured to periodically transmit advertising, news, notification, update, or other messages to users.

According to various embodiments, techniques and mechanisms described herein may be used to transmit messages in a variety of contexts. For example, a marketer may employ such techniques to transmit marketing messages. As another example, a systems administrator may employ such techniques to transmit instructions or information to users of a system. As yet another example, an information service provider may employ such techniques to transmit information such as news to subscribers.

A message transmission medium is identified at 206. In some implementations, the method 100 may be configured to transmit a message via email. Alternatively, or additionally, a different message transmission medium may be used. Such message transmission mediums may include, but are not limited to: Salesforce Chatter, voice over IP (VOIP), Viber messaging, short message service (SMS), Facebook Messenger, mobile push, WhatsApp messages, LinkedIn messages, Skype messages, and/or automated voice calls. In some configurations, a message may be sent via a native messaging services within an on-demand computing services environment.

According to various embodiments, a message transmission medium may be identified in various ways. For example, in some systems, a message transmission medium may be preconfigured for all messages. For instance, a system may be configured to only send messages via email. As another example, a message transmission medium may be determined based on user input. For instance, a user may select a particular message transmission medium to use.

In some implementations, different message transmission mediums may be used for the same message. For example, one recipient may receive a message via one transmission medium, while another recipient may receive a message via another transmission medium. As another example, different message batches may be sent via different transmission mediums.

In some embodiments, a message transmission medium may be selected for a recipient based on the recipient's identity. For example, a recipient may be associated with an address for one transmission medium but not for another transmission medium. As another example, a recipient may specify a preference for receiving messages via a particular transmission medium.

Recipients for the identified message are determined at 208. According to various embodiments, the message recipients may be identified at least in part based on user input. For example, message recipients may be selected from a list in a graphical user interface. As another example, message recipients may be identified via text input. As yet another example, a file may be uploaded that includes identifiers or addresses associated with message recipients.

In some implementations, user input may be used to identify recipient selection characteristics, which may then be used by the system to select recipients from a database. For example, configuration information may specify recipient characteristics based on demographic information, system characteristics, relationships, or other such attributes. Such characteristics may then be used to query one or more database tables to identify recipients who meet those characteristics.

In some embodiments, message recipients may be identified at least in part automatically. For example, the system may analyze the message identified at 204 to identify recipients for which the message is likely relevant. Such a procedure may involve, for example, performing a natural language processing technique such as topic modeling on the message and then using the resulting topics as query parameters for querying a database system.

Message batch parameter information is determined at 210. In some implementations, the message batch parameter information may include any information for use in determining the number and/or size of message batches to transmit. For example, the message batch parameter information may identify a number of batches into which to divide the recipients for message transmission. As another example, the message batch parameter information may identify the number of recipients to include in each batch. As yet another example, the message batch parameter information may identify an amount of time between the transmission of successive message batches.

In some implementations, the message batch parameter information may identify an easing function associated with batched message transmission. The easing function may specify message batch size as a numerical function, for instance based on the number of recipients and batches. For example, an easing function may receive as input a number of recipients for an initial batch, which are doubled for each successive batch until all recipients are messaged. As another example, an easing function may specify a percentage of all recipients to be messaged in successive batches (e.g., 5%, 10%, 15%, 25%, 45% for a total of 100%).

In particular embodiments, some or all of the message batch parameter information may be preconfigured. For instance, the system may supply one or more standard easing functions. Such preconfigured easing functions may be selectable by the user or the system. In one example, a preconfigured easing function uniformly distributes the recipients over a designated number (e.g., 5) batches of messages. In another example, a preconfigured easing function includes relatively few recipients in initial message batches and increases the number of recipients for each successive batch until all recipients are reached. In yet another example, a preconfigured easing function includes an initial testing phase in which one or more batches have a relatively small number of recipients and a subsequent mass transmission phase in which one or more batches have a relatively large number of recipients. A variety of configurations are possible, and may be strategically determined based on the context associated with the system in which one or more embodiments are implemented.

In some implementations, the message batch parameter information may identify time delays between successive message batches. For example, the time may be specified as a number of seconds, minutes, hours, or days. As another example, the time may be specified as the time required to collected a designated amount of performance information.

In particular embodiments, different batches of messages may be associated with different time delays. For instance, the time between initial message batches may be comparatively short since relatively few recipients may receive those messages, while the time between later message batches may be comparatively long due to the relatively larger number of message recipients receiving those messages.

One or more performance metrics for the message are identified at 212. According to various embodiments, one or more of a variety of performance metrics may be used to evaluate message performance. Such performance metrics may include, but are not limited to: application updating, application downloading, advertisement click through rate, advertisement conversion rate, mailing list unsubscribe requests, time spent on a website, message open rate, and/or message received rate. For example, a message may need to be adjusted or message transmission may need to be terminated if recipients are not complying with a request in the message, if recipients are not clicking on an advertisement link, if recipients are not making a purchase based on an advertisement link, if recipients are asking to be removed from a mailing list, if recipients are not spending time on a website after reading a message, if recipients are not opening a message, or if a relatively large number of recipients are not receiving their messages (e.g., due to faulty transmission or incorrect a addresses).

One or more performance thresholds for message transmission are determined at 214. In some implementations, a performance threshold may be specified by a user. Alternatively, or additionally, the system may suggest or designated a performance metric, for instance based on message characteristics.

In some embodiments, a performance threshold may specify a level associated with a single performance metric. For example, a performance threshold may specify a minimum click through rate, a maximum percentage of unsubscribe requests, a minimum conversion rate, a minimum number of downloads, or other such cutoffs.

In some embodiments, a performance threshold may specify a combination of performance cutoffs, for instance connected via Boolean logic. For example, a performance threshold may be a minimum click through rate and a maximum unsubscribe request rate, connected by a Boolean OR or AND operator. As another example, a performance threshold may be specified as a function operating on inputs such as the number of recipients, the message batch, and/or one or more performance metrics.

The interspersed batched message configuration information is stored at 216. In some implementations, the interspersed batched message configuration information may include any or all of the configuration information discussed with respect to the method 200 shown in FIG. 2. The information may be stored in any suitable storage location, such as a database system, for use in executing batched message transmission.

According to various embodiments, the operations shown in FIG. 2 may be performed in an order different than that shown. For example, a transmission medium may be identified at 206 after recipients are determined at 208. Alternatively, or additionally, one or more operations may be omitted, and/or other operations may be performed in addition to those shown.

Figure 3:
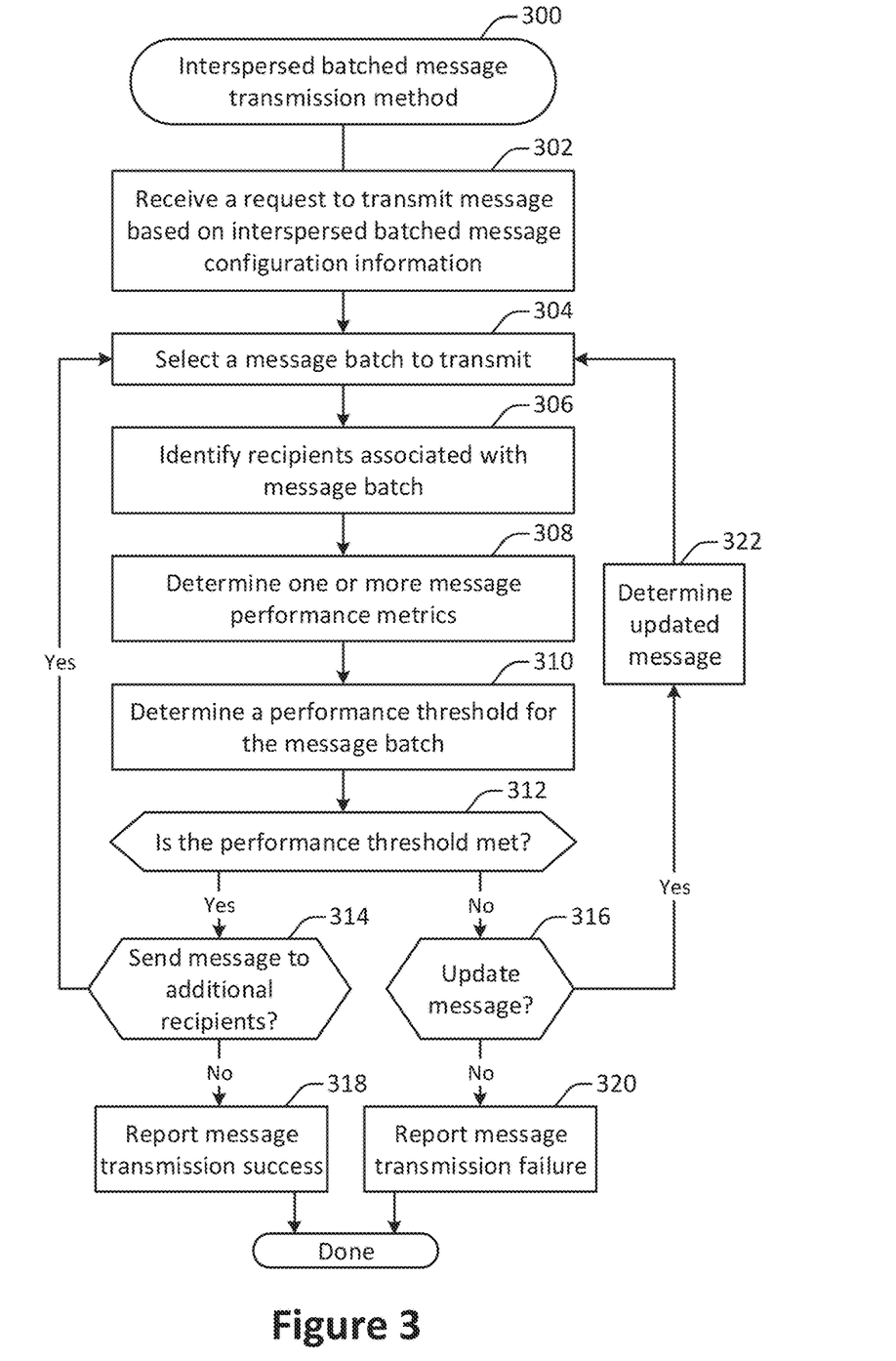
FIG. 3 illustrates an example of an method for interspersed batched message transmission, performed in accordance with one or more embodiments.

FIG. 3 illustrates an example of an method 300 for interspersed batched message transmission, performed in accordance with one or more embodiments. According to various embodiments, the method 200 may be performed at a database system. For example, the method 200 may be performed at a device or system shown in FIG. 4, FIG. 5, and/or FIG. 6. The method 200 may be performed in conjunction with other operations described herein, such as those discussed with respect to FIG. 1 and/or FIG. 2.

A request to transmit a message based on interspersed batched message configuration is received at 302. According to various embodiments, the request may be generated based on user input. For instance, a user may submit a request message or an instruction through a user interface to initiate interspersed batched message transmission. Alternatively, or additionally, the request may be generated automatically. For instance, message transmission may be scheduled in advance, or initiated when any suitable triggering condition is met.

A message batch to transmit is selected at 304. According to various embodiments, the message batch may be selected based on the configuration information determined as discussed with respect to the method 200 shown in FIG. 2. That is, an initial message batch may target relatively few recipients, while the number of recipients may be increased for successive batches.

Recipients associated with the message batch are identified at 306. In some implementations, specific message recipients may be included in particular message batches. For example, new subscribers may be included in early batches, while longtime subscribes may be included in later batches. As another example, particular groups of recipients such as departments within an organization may be included in the same message batches.

In some embodiments, message recipients may be selected at random. For instance, when a selected batch is configured to be transmitted to a designated number of recipients, the recipients may be selected at random, with replacement, from a list of available recipients. Those recipients may then be identified as having already been selected so that they are not selected for receipt of the message during subsequent batches.

One or more message performance metrics are determined at 308. In some implementations, one or more message performance metrics identified at 212 in FIG. 2 may be collected. Such performance metrics may be stored in a database system. For example, the message may include computer programming code configured to send a message to a remote location when a message is read or a link is clicked, and such messages may be used to determine a message read rate or a message click through rate. As another example, a link in a message may include a referral code which may be transmitted to the linked website when the link is clicked, and the referral code may be used to determine a message click through rate or conversion rate. As yet another example, each message recipient may be associated with an identifier, such as a user identifier in a computing environment. The user's actions within the computing environment may then be used to determine a metric characterizing a response to the message.

A performance threshold for the message batch is determined at 310. According to various embodiments, the performance threshold may be determined as discussed with respect to the operation 214 in the method 200 shown in FIG. 2.

A determination is made at 312 as to whether the performance threshold information is met. According to various embodiments, the determination may be made at least in part by applying the performance metric information determined at 308 to the performance threshold determined at 310. As discussed with respect to 214, applying the performance threshold may involve evaluating a single performance metric against a cutoff value. Alternatively, or additionally, more complex thresholds may be used. For instance, the threshold may be implemented as a function over one or more performance metrics.

If the performance threshold is met, then a determination is made at 314 as to whether to send the message to additional recipients. In some implementations, the determination may be made at least in part based on whether the message has been sent to every recipient identified at 208. If recipients who have not yet received the message remain, then the message may be sent to additional recipients.

If the performance threshold is not met, then a determination is made at 316 as to whether to update the message. If the message is updated, then at 322 an updated message is determined. In some implementations, whether to update the message and/or the updated message to be used may be determined at least in part based on an automated procedure. For example, the message may have one or more optimization parameters that may be updated dynamically by the system. As another example, the system may apply a machine learning model to update the message based on performance metric feedback.

In some embodiments, whether to update the message and/or the updated message to be used may be determined at least in part based on user input. For example, a user may be notified when message transmission has failed, and be invited to update the message prior to subsequent transmission. The user may then provide a different message, request that message transmission proceed with the original message, request that message transmission be terminated, or take some other action.

In particular embodiments, some or all of the configuration information determined as described in the method 200 may be altered based on the performance of the message transmission. For instance, if the performance threshold is not met and the message is updated as described at operations 312, 316, and 322, then configuration information may be changed for subsequent message iterations. As one example, the number of message recipients for the subsequent message batch may be reduced relative to the number of message recipients scheduled for receipt had the performance threshold been met.

If a determination is made not to send the message to additional recipients, then message transmission success is reported at 318. If instead the performance threshold is not met and no message changes are made, then message transmission failure is reported at 320.

According to various embodiments, message transmission success or failure information may include any of a variety of metrics. For example, the performance of one or more message batches according to one or more performance metrics may be reported. As another example, the number of recipients of the message may be reported. As yet another example, whether each message batch was transmitted may be reported.

According to various embodiments, a report on message performance may be made in any of various ways. For example, message transmission and/or performance information may be stored in a database, sent via a message to a message recipient, and/or transmitted to a remote machine.

Figure 4:
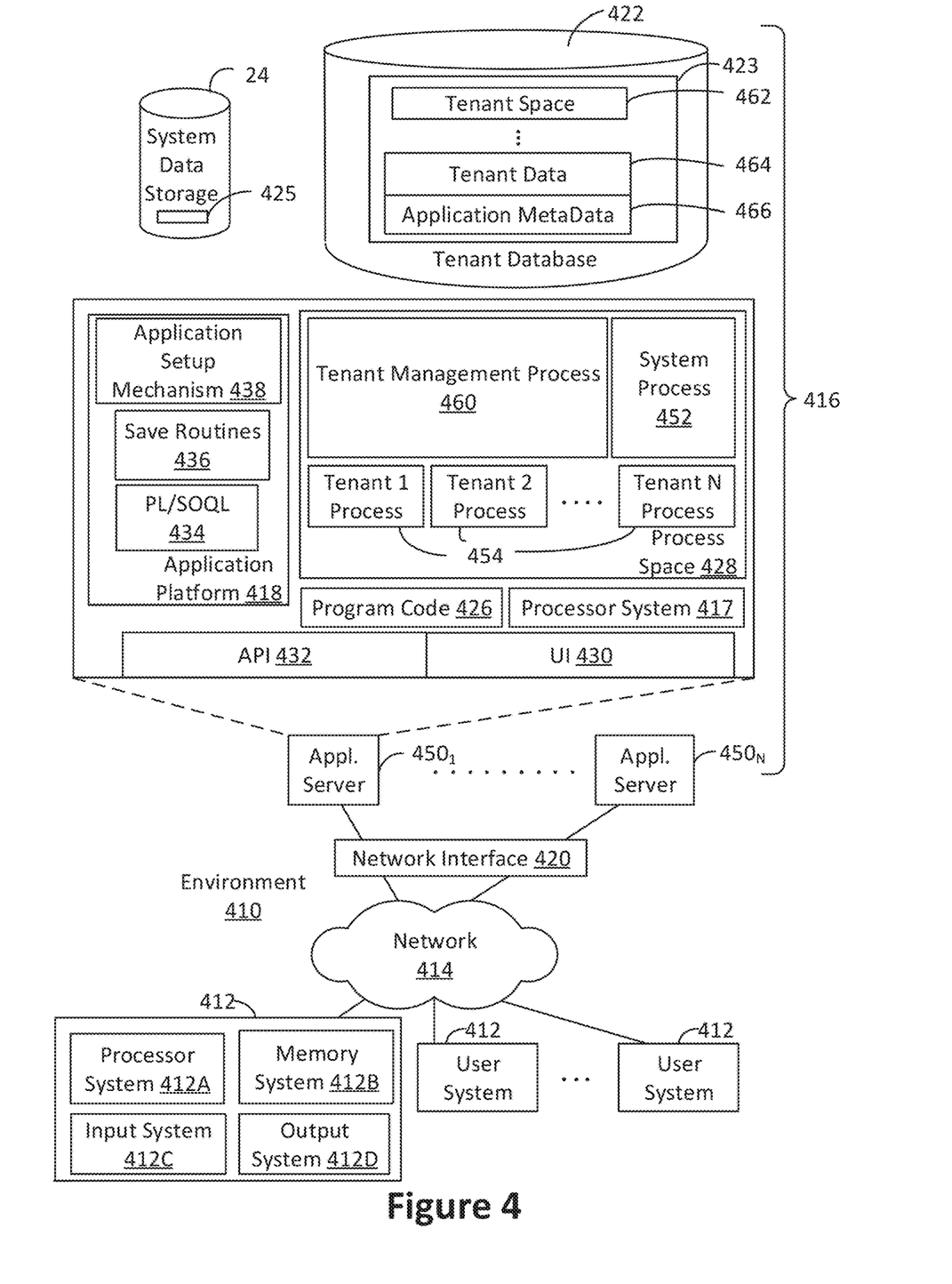
FIG. 4 shows a block diagram of an example of an environment ?10 that includes an on-demand database service configured in accordance with some implementations.

FIG. 4 shows a block diagram of an example of an environment 410 that includes an on-demand database service configured in accordance with some implementations.

Environment 410 may include user systems 412, network 414, database system 416, processor system 417, application platform 418, network interface 420, tenant data storage 422, tenant data 423, system data storage 424, system data 425, program code 426, process space 428, User Interface (UI) 430, Application Program Interface (API) 432, PL/SOQL 434, save routines 436, application setup mechanism 438, application servers 450-1 through 450-N, system process space 452, tenant process spaces 454, tenant management process space 460, tenant storage space 462, user storage 464, and application metadata 466. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 416, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 416. Such applications may be developed by the database service provider or by users or third-party application developers accessing the service. Application platform 418 includes an application setup mechanism 438 that supports application developers' creation and management of applications, which may be saved as metadata into tenant data storage 422 by save routines 436 for execution by subscribers as one or more tenant process spaces 454 managed by tenant management process 460 for example. Invocations to such applications may be coded using PL/SOQL 434 that provides a programming language style interface extension to API 432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 466 for a subscriber making such an invocation. Such system processes may also manage execution of application metadata 466 as an application in a virtual machine.

In some implementations, each application server 450 may handle requests for any user associated with any organization. A load balancing function (e.g., an F5 Big-IP load balancer) may distribute requests to the application servers 450 based on an algorithm such as least-connections, round robin, observed response time, etc. Each application server 450 may be configured to communicate with tenant data storage 422 and the tenant data 423 therein, and system data storage 424 and the system data 425 therein to serve requests of user systems 412. The tenant data 423 may be divided into individual tenant storage spaces 462, which can be either a physical arrangement and/or a logical arrangement of data. Within each tenant storage space 462, user storage 464 and application metadata 466 may be similarly allocated for each user. For example, a copy of a user's most recently used (MRU) items might be stored to user storage 464. Similarly, a copy of MRU items for an entire tenant organization may be stored to tenant storage space 462. A UI 430 provides a user interface and an API 432 provides an application programming interface to system 416 resident processes to users and/or developers at user systems 412.

System 416 may implement a web-based message transmission and configuration system. For example, in some implementations, system 416 may include application servers configured to implement and execute interspersed message batching software applications. The application servers may be configured to provide related data, code, forms, web pages and other information to and from user systems 412. Additionally, the application servers may be configured to store information to, and retrieve information from a database system. Such information may include related data, objects, and/or Webpage content. With a multi-tenant system, data for multiple tenants may be stored in the same physical database object in tenant data storage 422, however, tenant data may be arranged in the storage medium(s) of tenant data storage 422 so that data of one tenant is kept logically separate from that of other tenants. In such a scheme, one tenant may not access another tenant's data, unless such data is expressly shared.

Several elements in the system shown in FIG. 4 include conventional, well-known elements that are explained only briefly here. For example, user system 412 may include processor system 412A, memory system 412B, input system 412C, and output system 412D. A user system 412 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 412 to access, process and view information, pages and applications available from system 416 over network 414. Network 414 may be any network or combination of networks of devices that communicate with one another, such as any one or any combination of a LAN (local area network), WAN (wide area network), wireless network, or other appropriate configuration.

The users of user systems 412 may differ in their respective capacities, and the capacity of a particular user system 412 to access information may be determined at least in part by "permissions" of the particular user system 412. As discussed herein, permissions generally govern access to computing resources such as data objects, components, and other entities of a computing system, such as an interspersed message batching system, a social networking system, and/or a CRM database system. "Permission sets" generally refer to groups of permissions that may be assigned to users of such a computing environment. For instance, the assignments of users and permission sets may be stored in one or more databases of System 416. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 416 may provide on-demand database service to user systems 412 using an MTS arrangement. By way of example, one tenant organization may be a company that employs a sales force where each salesperson uses system 416 to manage their sales process. Thus, a user in such an organization may maintain contact data, leads data, customer follow-up data, performance data, goals and progress data, etc., all applicable to that user's personal sales process (e.g., in tenant data storage 422). In this arrangement, a user may manage his or her sales efforts and cycles from a variety of devices, since relevant data and applications to interact with (e.g., access, view, modify, report, transmit, calculate, etc.) such data may be maintained and accessed by any user system 412 having network access.

When implemented in an MTS arrangement, system 416 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 416 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 416 may also maintain system-level data usable by multiple tenants or other data. Such system-level data may include industry reports, news, postings, and the like that are sharable between tenant organizations.

In some implementations, user systems 412 may be client systems communicating with application servers 450 to request and update system-level and tenant-level data from system 416. By way of example, user systems 412 may send one or more queries requesting data of a database maintained in tenant data storage 422 and/or system data storage 424. An application server 450 of system 416 may automatically generate one or more SQL statements (e.g., one or more SQL queries) that are designed to access the requested data. System data storage 424 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 5A:
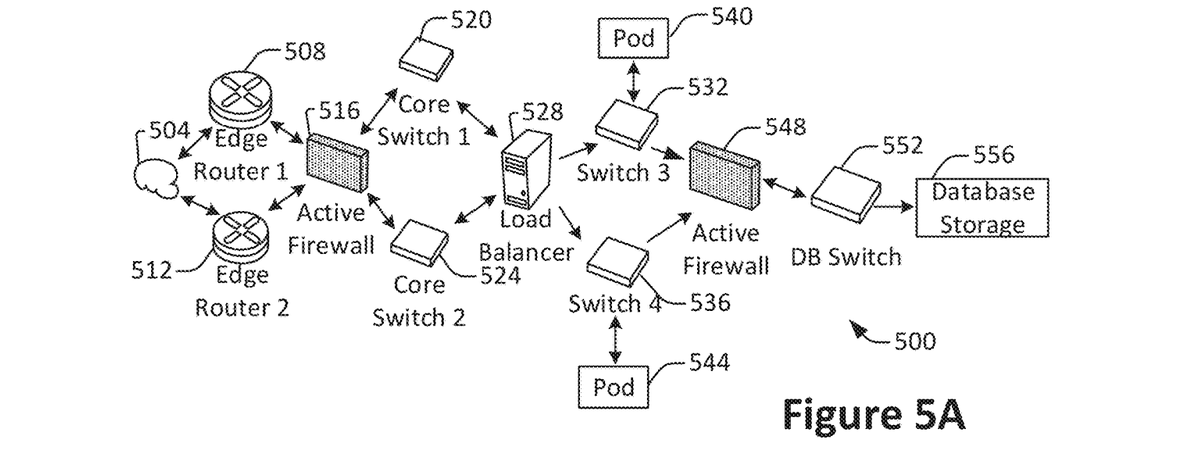
FIG. 5A shows a system diagram of an example of architectural components of an on-demand database service environment, configured in accordance with some implementations.

FIG. 5A shows a system diagram of an example of architectural components of an on-demand database service environment 500, configured in accordance with some implementations. A client machine located in the cloud 504 may communicate with the on-demand database service environment via one or more edge routers 508 and 512. A client machine may include any of the examples of user systems 412 described above. The edge routers 508 and 512 may communicate with one or more core switches 520 and 524 via firewall 516. The core switches may communicate with a load balancer 528, which may distribute server load over different pods, such as the pods 540 and 544 by communication via pod switches 532 and 536. The pods 540 and 544, which may each include one or more servers and/or other computing resources, may perform data processing and other operations used to provide on-demand services. Components of the environment may communicate with a database storage 556 via a database firewall 548 and a database switch 552.

Accessing an on-demand database service environment may involve communications transmitted among a variety of different components. The environment 500 is a simplified representation of an actual on-demand database service environment. For example, some implementations of an on-demand database service environment may include any-where from one to many devices of each type. Additionally, an on-demand database service environment need not include each device shown, or may include additional devices not shown, in FIGS. 5A and 5B.

The cloud 504 refers to any suitable data network or combination of data networks, which may include the Internet. Client machines located in the cloud 504 may communicate with the on-demand database service environment 500 to access services provided by the on-demand database service environment 500. By way of example, client machines may access the on-demand database service environment 500 to retrieve, store, edit, and/or process interspersed message batching information.

In some implementations, the edge routers 508 and 512 route packets between the cloud 504 and other components of the on-demand database service environment 500. The edge routers 508 and 512 may employ the Border Gateway Protocol (BGP). The edge routers 508 and 512 may maintain a table of IP networks or 'prefixes', which designate network reachability among autonomous systems on the internet.

In one or more implementations, the firewall 516 may protect the inner components of the environment 500 from internet traffic. The firewall 516 may block, permit, or deny access to the inner components of the on-demand database service environment 500 based upon a set of rules and/or other criteria. The firewall 516 may act as one or more of a packet filter, an application gateway, a stateful filter, a proxy server, or any other type of firewall.

In some implementations, the core switches 520 and 524 may be high-capacity switches that transfer packets within the environment 500. The core switches 520 and 524 may be configured as network bridges that quickly route data between different components within the on-demand database service environment. The use of two or more core switches 520 and 524 may provide redundancy and/or reduced latency.

In some implementations, communication between the pods 540 and 544 may be conducted via the pod switches 532 and 536. The pod switches 532 and 536 may facilitate communication between the pods 540 and 544 and client machines, for example via core switches 520 and 524. Also or alternatively, the pod switches 532 and 536 may facilitate communication between the pods 540 and 544 and the database storage 556. The load balancer 528 may distribute workload between the pods, which may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548, which may act as a computer application firewall operating at the database application layer of a protocol stack. The database firewall 548 may protect the database storage 556 from application attacks such as structure query language (SQL) injection, database rootkits, and unauthorized information disclosure. The database firewall 548 may include a host using one or more forms of reverse proxy services to proxy traffic before passing it to a gateway router and/or may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, the database storage 556 may be an on-demand database system shared by many different organizations. The on-demand database service may employ a single-tenant approach, a multi-tenant approach, a virtualized approach, or any other type of database approach. Communication with the database storage 556 may be conducted via the database switch 552. The database storage 556 may include various software components for handling database queries. Accordingly, the database switch 552 may direct database queries transmitted by other components of the environment (e.g., the pods 540 and 544) to the correct components within the database storage 556.

Figure 5B:
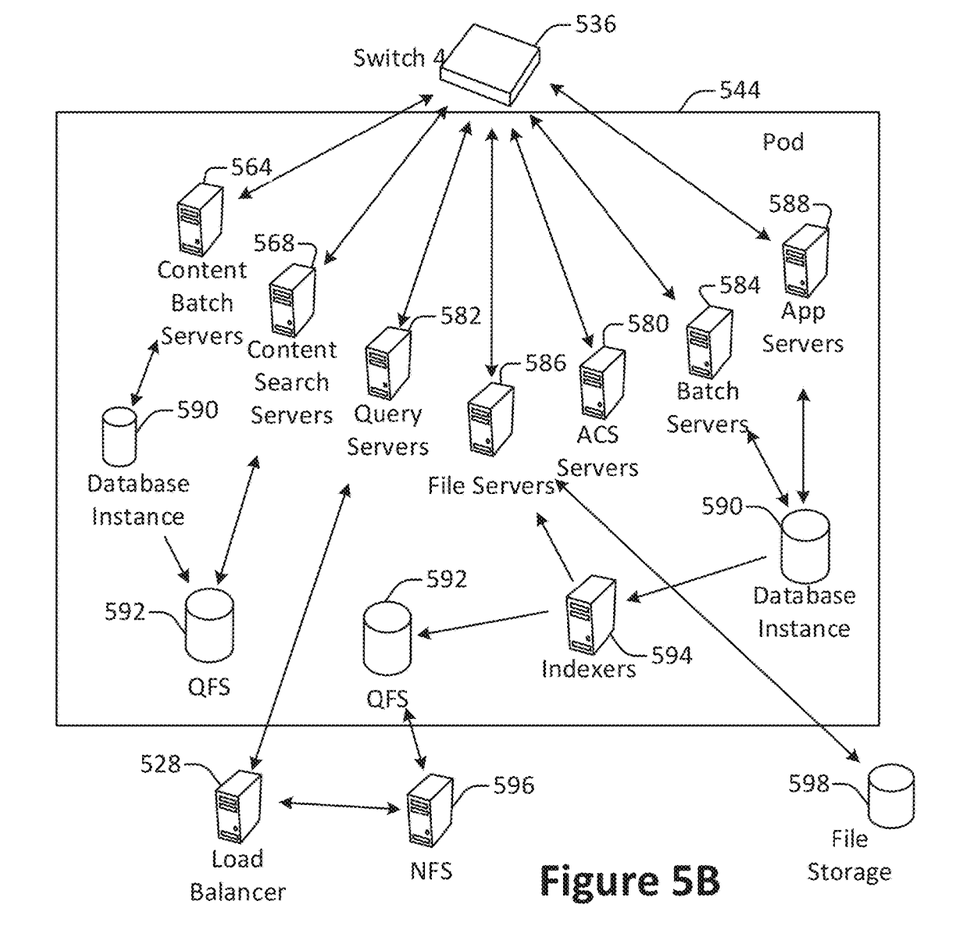
FIG. 5B shows a system diagram further illustrating an example of architectural components of an on-demand database service environment, in accordance with some implementations.

FIG. 5B shows a system diagram further illustrating an example of architectural components of an on-demand database service environment, in accordance with some implementations. The pod 544 may be used to render services to user(s) of the on-demand database service environment 500. The pod 544 may include one or more content batch servers 564, content search servers 568, query servers 582, file servers 586, access control system (ACS) servers 580, batch servers 584, and app servers 588. Also, the pod 544 may include database instances 590, quick file systems (QFS) 592, and indexers 594. Some or all communication between the servers in the pod 544 may be transmitted via the switch 536.

In some implementations, the app servers 588 may include a framework dedicated to the execution of procedures (e.g., programs, routines, scripts) for supporting the construction of applications provided by the on-demand database service environment 500 via the pod 544. One or more instances of the app server 588 may be configured to execute all or a portion of the operations of the services described herein.

In some implementations, as discussed above, the pod 544 may include one or more database instances 590. A database instance 590 may be configured as an MTS in which different organizations share access to the same database, using the techniques described above. Database information may be transmitted to the indexer 594, which may provide an index of information available in the database 590 to file servers 586. The QFS 592 or other suitable filesystem may serve as a rapid-access file system for storing and accessing information available within the pod 544. The QFS 592 may support volume management capabilities, allowing many disks to be grouped together into a file system. The QFS 592 may communicate with the database instances 590, content search servers 568 and/or indexers 594 to identify, retrieve, move, and/or update data stored in the network file systems (NFS) 596 and/or other storage systems.

In some implementations, one or more query servers 582 may communicate with the NFS 596 to retrieve and/or update information stored outside of the pod 544. The NFS 596 may allow servers located in the pod 544 to access information over a network in a manner similar to how local storage is accessed. Queries from the query servers 522 may be transmitted to the NFS 596 via the load balancer 528, which may distribute resource requests over various resources available in the on-demand database service environment 500. The NFS 596 may also communicate with the QFS 592 to update the information stored on the NFS 596 and/or to provide information to the QFS 592 for use by servers located within the pod 544.

In some implementations, the content batch servers 564 may handle requests internal to the pod 544. These requests may be long-running and/or not tied to a particular customer, such as requests related to log mining, cleanup work, and maintenance tasks. The content search servers 568 may provide query and indexer functions such as functions allowing users to search through content stored in the on-demand database service environment 500. The file servers 586 may manage requests for information stored in the file storage 598, which may store information such as documents, images, basic large objects (BLOBs), etc. The query servers 582 may be used to retrieve information from one or more file systems. For example, the query system 582 may receive requests for information from the app servers 588 and then transmit information queries to the NFS 596 located outside the pod 544. The ACS servers 580 may control access to data, hardware resources, or software resources called upon to render services provided by the pod 544. The batch servers 584 may process batch jobs, which are used to run tasks at specified times. Thus, the batch servers 584 may transmit instructions to other servers, such as the app servers 588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 6:
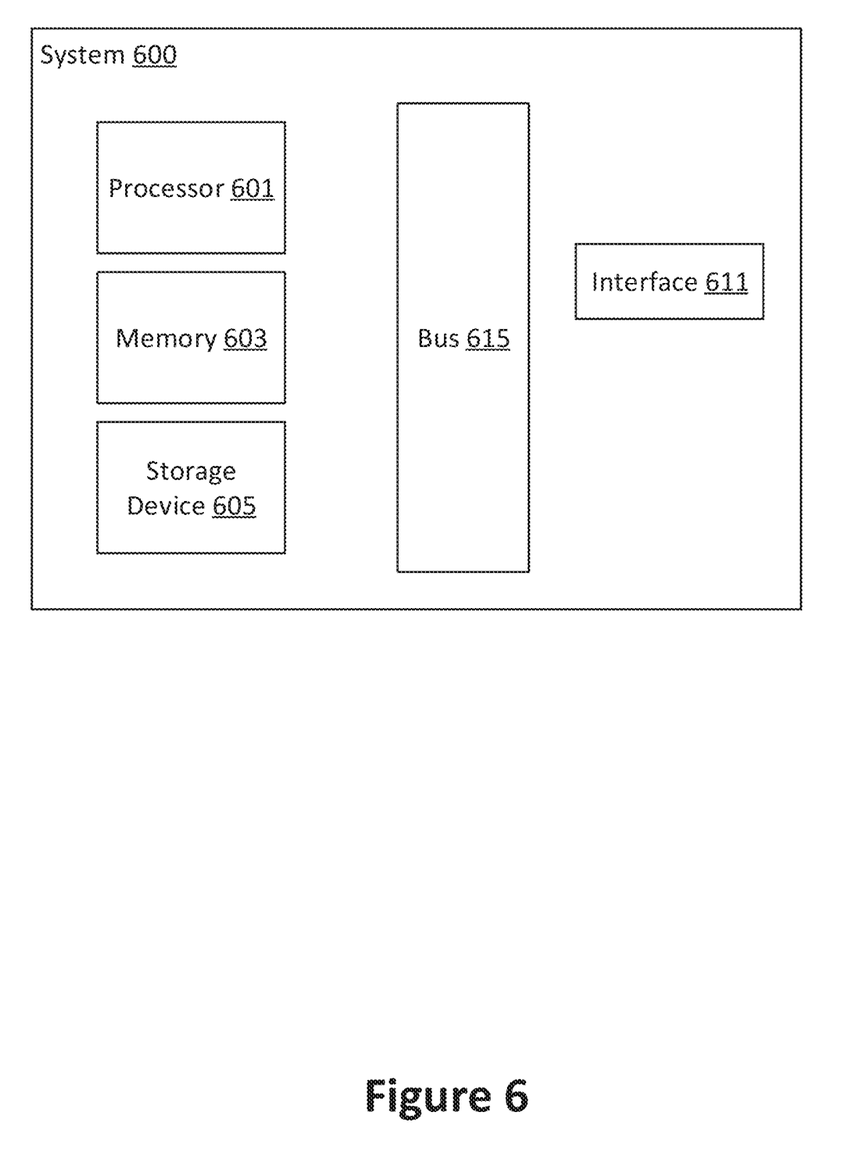
FIG. 6 illustrates one example of a computing device.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network.

Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computer-implemented method comprising:
   receiving via a communication interface a message for transmission to a plurality of recipients;
   determining via a processor a message hatching configuration for the message, the message batching configuration including a plurality of message batches for transmitting the message, the message batching configuration including a respective recipient count for each of the message batches, the message batching configuration including a respective time delay between each of the message batches, the message hatching configuration including a designated performance metric for evaluating the message;
   for each of two or more of the message batches; transmitting the message to a respective subset of the recipients via a network in accordance with the respective recipient count, transmission of successive message batches being delayed in accordance with the respective time del ay;
   when it is determined that the designated performance metric fails to meet a designated performance metric threshold, updating the message based on the designated performance metric failing to meet the designated performance metric threshold, to create an updated message;
   reducing, based on the designated performance metric failing to meet the designated performance metric threshold, the respective recipient count for a subsequent message batch; and
   transmitting the updated message to the reduced number of respective recipients the subsequent message batch via the network.

2. The method recited in claim 1, wherein each subset of the recipients is determined by randomly selecting recipients from a database table.

3. The method recited in claim 2, wherein the message hatching configuration includes one or more criteria for selecting the recipients from the database table.

4. The method recited in claim 2, wherein the database table is stored in a multitenant database system within an on-demand computing services environment configured to provide computing services to a plurality of organizations.

5. The method recited in claim 1, wherein the designated performance metric is a click through rate.

6. The method recited in claim 1, wherein the determining the message batching configuration comprises providing for increasing respective recipient count for each successive message batch.

7. The method recited in claim 1, wherein determining whether the designated performance metric fails to meet the designated performance metric threshold comprises applying a function over a plurality of performance metrics, the plurality of performance metrics including the designated performance metric.

8. The method recited in claim 1, the method further comprising:
   determining the designated performance metric for one or more of the message batches based on performance data received by a database system.

9. A system configured to perform a method, the method comprising:
   receiving, via a communication interface a message for transmission to a plurality of recipients;
   determining via a processor a message hatching configuration for the message, the message batching configuration including a plurality of message batches for transmitting the message, the message hatching configuration including a respective recipient count for each of the message hatches, the message hatching configuration including a respective time delay between each of the message batches, the message hatching configuration including a designated performance metric for evaluating the message;

for each of two or more of the message batches, transmitting the message to a respective subset of the recipients via a network in accordance with the respective recipient count, transmission of successive message batches being delayed in accordance with the respective time delay;

when it is determined that the designated performance metric fails to meet a designated performance metric threshold, updating the message based on the designated performance metric failing to meet the designated performance metric threshold, to create an updated message;

reducing, based on the designated performance metric failing to meet the designated performance metric threshold, the respective recipient count for a subsequent message batch; and transmitting the updated message to the reduced number of respective recipients the subsequent message batch via the network.

10. The system recited in claim 9, wherein each subset of the recipients is determined by randomly selecting recipients from a database table.

11. The system recited in claim 10, wherein the message batching configuration includes one or more criteria for selecting the recipients from the database table.

12. The system recited in claim 10, wherein the database table is stored in a multitenant database system within an on-demand computing services environment configured to provide computing services to a plurality of organizations.

13. The system recited in claim 9, wherein the designated performance metric is a click through rate.

14. The system recited in claim 9, wherein the determining the message batching configuration comprises providing for increasing respective recipient count for each successive message batch.

15. The system recited in claim 9, the method further comprising:

determining the designated performance metric for one or more of the message batches based on performance data received by a database system.

16. One or more non-transitory computer readable media configured to perform a method, the method comprising:

receiving via a communication interface a message for transmission to a plurality of recipients;

determining via a processor a message batching configuration for the message, the message batching configuration including a plurality of message batches for transmitting the message, the message batching configuration including a respective recipient count for each of the message batches, the message batching configuration including a respective time delay between each of the message hatches, the message batching configuration including a designated performance metric for evaluating the message;

for each of two or more of the message hatches, transmitting the message to a respective subset of the recipients via a network in accordance with the respective recipient count, transmission of successive message batches being delayed in accordance with the respective time delay;

when it is determined that the designated performance metric fails to meet a designated performance metric threshold, updating the message based on the designated performance metric failing to meet the designated performance metric threshold, to create an updated message;

reducing, based on the designated performance metric failing to meet the designated performance metric threshold, the respective recipient count for a subsequent message batch; and transmitting the updated message to the reduced number of respective recipients the subsequent message batch via the network.

17. The one or more non-transitory computer readable media recited in claim 16, wherein each subset of the recipients is determined by randomly selecting recipients from a database table.

18. The one or more non-transitory computer readable media recited in claim 17, wherein the database table is stored in a multitenant database system within an on-demand computing services environment configured to provide computing services to a plurality of organizations.

19. The one or more non-transitory computer readable media recited in claim 16, wherein the designated performance metric is a click through rate.

20. The one or more non-transitory computer readable media recited in claim 16, wherein the determining the message batching configuration comprises providing for increasing respective recipient count for each successive message batch.

\* \* \* \* \*